United States Patent
Pan

(10) Patent No.: US 9,497,532 B2
(45) Date of Patent: *Nov. 15, 2016

(54) HEADPHONE DEVICE WITH CONTROLLING FUNCTION

(71) Applicant: Primax Electronics Ltd., Neihu, Taipei (TW)

(72) Inventor: Yung-Tai Pan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/638,771

(22) Filed: Mar. 4, 2015

(65) Prior Publication Data

US 2016/0198249 A1 Jul. 7, 2016

(30) Foreign Application Priority Data

Jan. 5, 2015 (TW) .............................. 104100050 A

(51) Int. Cl.
*H04R 1/10* (2006.01)
*G06F 3/16* (2006.01)
*G06F 3/01* (2006.01)

(52) U.S. Cl.
CPC ............. *H04R 1/1041* (2013.01); *G06F 3/017* (2013.01); *G06F 3/165* (2013.01); *H04R 1/1008* (2013.01); *H04R 2201/103* (2013.01); *H04R 2201/109* (2013.01)

(58) Field of Classification Search
CPC ............................ H04R 5/033; H04R 1/1041
See application file for complete search history.

(56) References Cited

U.S. PATENT DOCUMENTS

| | | | |
|---|---|---|---|
| 6,233,368 B1 * | 5/2001 | Badyal | H04N 3/155 257/265 |
| 7,631,811 B1 * | 12/2009 | Brown | G06F 3/03547 235/454 |

* cited by examiner

*Primary Examiner* — Simon King
(74) *Attorney, Agent, or Firm* — Kirton McConkie; Evan R. Witt

(57) ABSTRACT

A headphone device with a controlling function is provided. The headphone device includes a headphone body and an optical finger navigation module. The optical finger navigation module is installed on the headphone body and exposed to an operating surface of the headphone body. When the optical finger navigation module is operated with the user's finger, an audio generator in communication with the headphone device is correspondingly controlled. Since the optical finger navigation module is slim and small, the optical finger navigation module can be applied to various types of headphone devices.

8 Claims, 7 Drawing Sheets

HEADPHONE DEVICE WITH CONTROLLING FUNCTION

FIELD OF THE INVENTION

The present invention relates to a headphone device, and more particularly to a headphone device with a controlling function.

BACKGROUND OF THE INVENTION

Generally, a headphone device is worn on the user's ears. The headphone device is in communication with an audio generator. The audio generator can play music and transmit an audio signal of the music to the headphone device. Consequently, the audio signal is outputted from the speakers of the headphone device so as to be listened by the user.

The headphone devices are usually classified into two types, i.e. an in-ear type headphone device and a circumaural type headphone device. For wearing the in-ear type headphone device, a headphone body of the headphone is inserted into the ear canal of the user. The in-ear type headphone device is small and easily carried. However, since the headphone body of the in-ear type headphone device is inserted into the ear canal, the user may be suffered from foreign body sensation and poor wear comfort in the ear. Moreover, the headphone body of the in-ear type headphone device is prone to falling out from the ear and difficultly fixed in the ear. The circumaural type headphone device is worn on the head of the user, and the user's ear is surrounded by the headphone body of the circumaural type headphone device. The circumaural type headphone device is comfortable to the user. However, the circumaural type headphone device is lager and difficulty carried. Moreover, the circumaural type headphone device is not feasible to the user who wears glasses. If the glasses and the circumaural type headphone device are simultaneously worn, the glasses and the circumaural type headphone device may interfere with each other. Under this circumstance, it is difficult to wear the circumaural type headphone device or the glasses. Since different headphone devices have their features, the user may select a desired headphone device according to the practical requirements.

In recent years, the headphone device is equipped with plural buttons for facilitating the user to operate the headphone device. When the headphone device is worn by the user, the user may press one of the buttons to execute the "Previous", "Next", "Play" or "Pause" function. However, the plural buttons are usually installed on the connecting wire of the wired in-ear type headphone device. That is, the wireless headphone device is not suitably equipped with the plural buttons.

Therefore, there is a need of providing a headphone device with a controlling function, in which the headphone device is any type headphone device.

SUMMARY OF THE INVENTION

An object of the present invention provides a headphone device with a controlling function. The user can operate the headphone device without the need of watching the headphone device with the eyes.

In accordance with an aspect of the present invention, there is provided a headphone device with a controlling function. The headphone device is in communication with an audio generator to receive a sound signal from the audio generator. The headphone device includes a headphone body, a speaker and an optical finger navigation module. The headphone body is in contact with an ear of a user. The speaker is disposed within the headphone body. After the sound signal from the audio generator is received, the sound signal is outputted from the speaker. The optical finger navigation module is installed on the headphone body and exposed to an operating surface of the headphone body. When an operation on the optical finger navigation module with a finger of the user is detected by the optical finger navigation module, the optical finger navigation module generates a control signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the prior art technologies, the present invention provides a headphone device with a controlling function.

Figure 1:
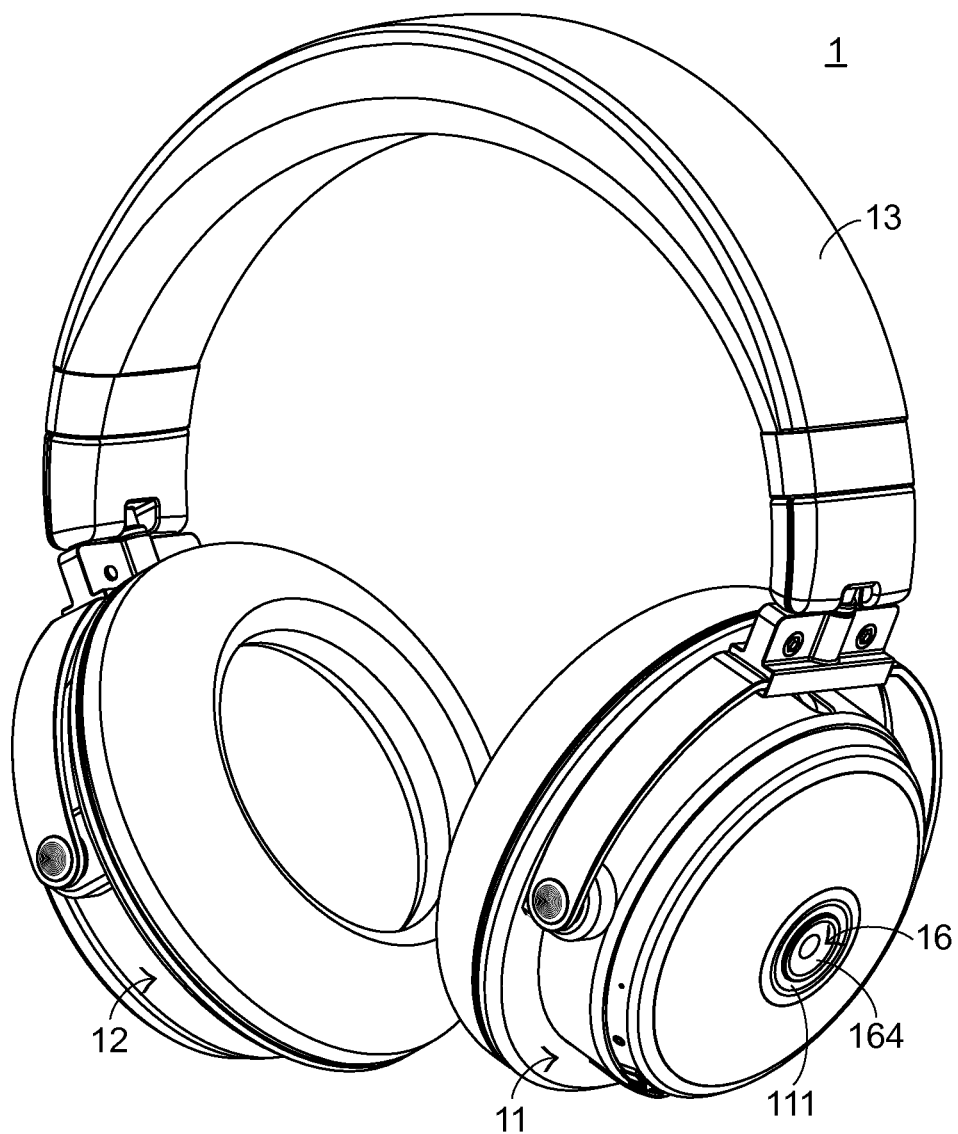
FIG. 1 is a schematic perspective view illustrating the structure of a headphone device with a controlling function according to a first embodiment of the present invention.
Figure 2:
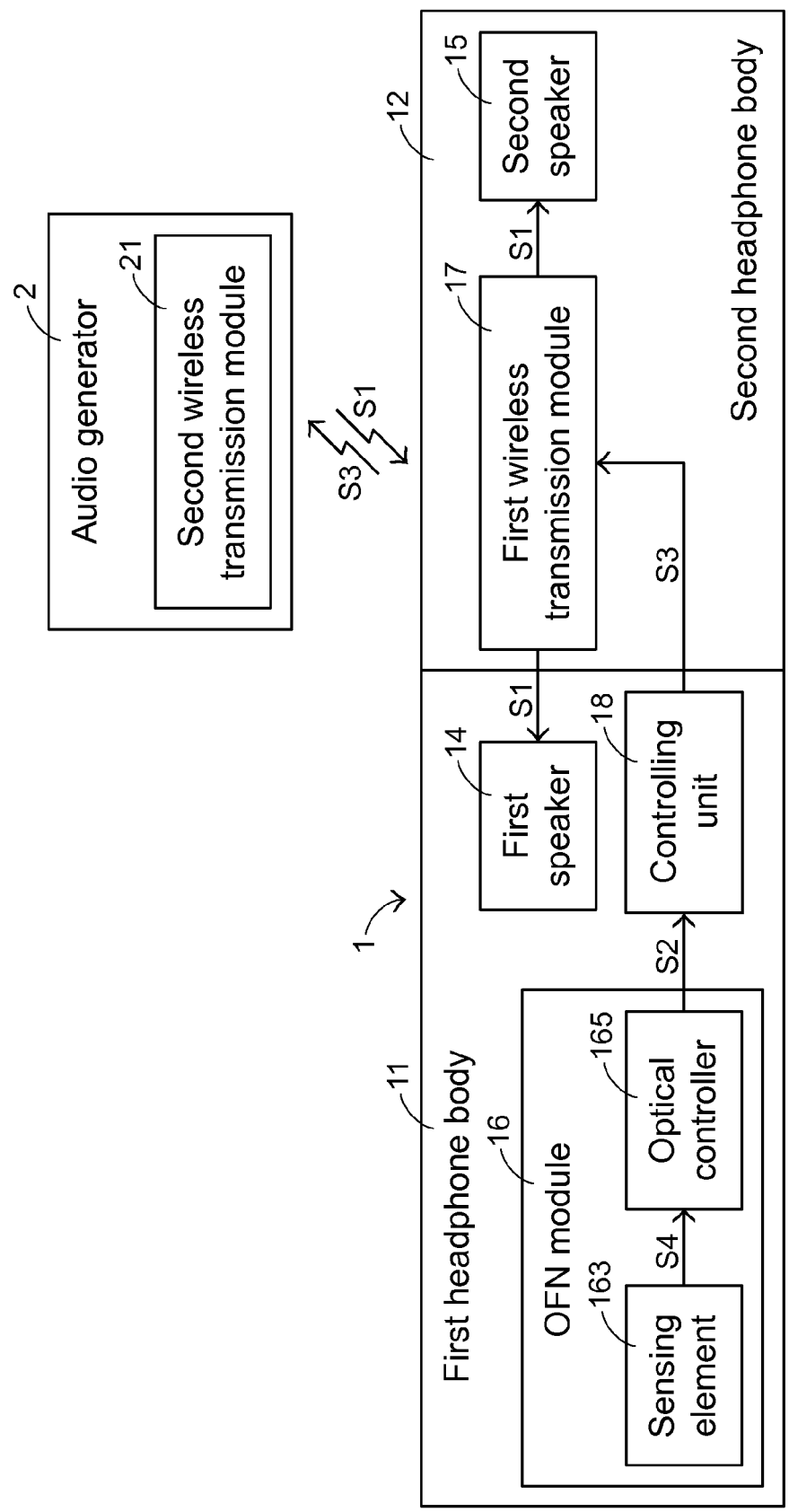
FIG. 2 is a schematic functional block diagram illustrating the headphone device according to the first embodiment of the present invention.

Hereinafter, the structure of the headphone device of the present invention will be illustrated with reference to FIGS. 1 and 2. FIG. 1 is a schematic perspective view illustrating the structure of a headphone device with a controlling function according to a first embodiment of the present invention. FIG. 2 is a schematic functional block diagram illustrating the headphone device according to the first embodiment of the present invention. The headphone device 1 is in communication with an audio generator 2. The audio generator 2 may generate a sound signal S1. The headphone device 1 is used for receiving and playing the sound signal S1. The headphone device 1 comprises a first headphone body 11, a second headphone body 12, a head band 13, a first speaker 14, a second speaker 15, an optical finger navigation (OFN) module 16, a first wireless transmission module 17 and a controlling unit 18. The first wireless transmission module 17 is disposed within the second headphone body 12. A second wireless transmission module 21 is disposed within the audio generator 2. The first wireless transmission module 17 may be in wireless communication with the second wireless transmission module 21 by a wireless transmission technology.

In this embodiment, the headphone device 1 is a circumaural type headphone device, and the audio generator 2 is a smart phone. Moreover, the first wireless transmission module 17 and the second wireless transmission module 21 are in wireless communication with each other by a Bluetooth transmission technology. It is noted that numerous modifications and alterations may be made while retaining the teachings of the invention. For example, in another embodiment, the first wireless transmission module and the second wireless transmission module are in wireless communication with each other by a near field communication (NFC) technology. In another embodiment, the headphone device is equipped with both of a Bluetooth transmission module and a near field communication module. For example, the Bluetooth transmission module is disposed within the first headphone body, and the near field communication module is disposed within the second headphone body. The user may select one of the Bluetooth transmission module and the near field communication module to establish the wireless connection between the headphone device and the audio generator. Alternatively, both of the Bluetooth transmission module and the near field communication module may be disposed within the same headphone body by simple substitution.

The first headphone body 11 and the second headphone body 12 correspond to a left ear and a right ear of the user, respectively. Moreover, the first headphone body 11 and the second headphone body 12 are connected with each other through the head band 13. When the headphone device 1 is worn by the user, the first headphone body 11 is in contact with the left ear of the user, and the second headphone body 12 is in contact with the right ear of the user. The first speaker 14 is disposed within the first headphone body 11 and connected with the first wireless transmission module 17. After the sound signal S1 from the audio generator 2 is received, the sound signal S1 may be outputted from the first speaker 14. Like the first speaker 14, the second speaker 15 is disposed within the second headphone body 12 and connected with the first wireless transmission module 17. After the sound signal S1 from the audio generator 2 is received, the sound signal S1 may be outputted from the second speaker 15. By means of the first speaker 14 and the second speaker 15, the both ears of the user wearing the headphone device 1 can hear the sound signal S1. The first speaker 14 is connected with the first wireless transmission module 17 through a signal wire (not shown). The signal wire is extended to the second headphone body 12 through the head band 13 so as to be connected with the first wireless transmission module 17.

As shown in FIG. 1, the optical finger navigation module 16 is disposed within the first headphone body 11 and exposed to an operating surface 111 of the first headphone body 11. The optical finger navigation module 16 is used to detect the movement of the user's finger F, thereby generating a moving trajectory signal S2. The top surface of the optical finger navigation module 16 is not at the same level of the operating surface 111 of the first headphone body 11. The controlling unit 18 is disposed within the first headphone body 11, and connected with the optical finger navigation module 16 and the first wireless transmission module 17. The controlling unit 18 is connected with the first wireless transmission module 17 through an additional signal wire (not shown). The additional wire is also extended to the second headphone body 12 through the head band 13 so as to be connected with the first wireless transmission module 17. Moreover, according to the moving trajectory signal S2 generated by the optical finger navigation module 16, the controlling unit 18 generates a corresponding control signal S3. The control signal S3 is transmitted to the audio generator 2 through the first wireless transmission module 17. In this embodiment, the operating surface 111 of the first headphone body 11 is an outer surface of the first headphone body 11.

Figure 3:
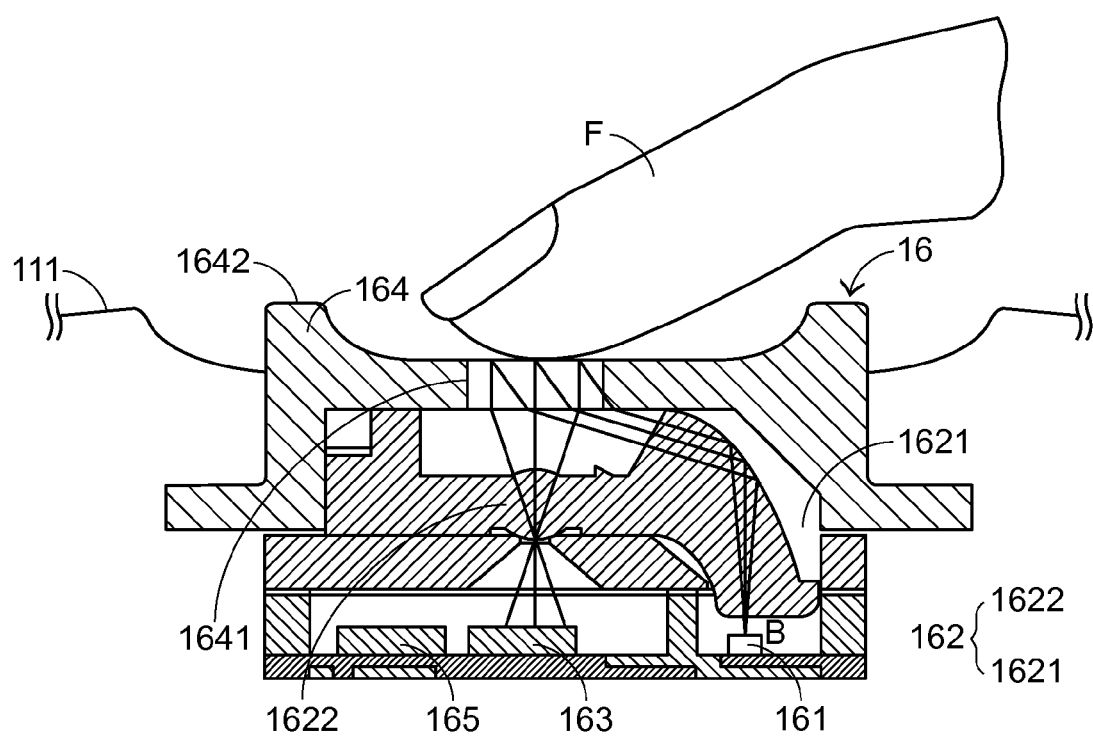
FIG. 3 is a schematic side cross-sectional view of the optical finger navigation module of the headphone device according to the first embodiment of the present invention.

Hereinafter, the detailed structure of the optical finger navigation module 16 will be illustrated with reference to FIGS. 2 and 3. FIG. 3 is a schematic side cross-sectional view of the optical finger navigation module of the headphone device according to the first embodiment of the present invention. The optical finger navigation module 16 comprises a light source 161, an optical assembly 162, a sensing element 163, an upper cover 164 and an optical controller 165. The light source 161 emits a light beam B. The optical assembly 162 is used for reflecting the light beam B to the user's finger F and focusing the light beam B which is reflected by the user's finger F. In this embodiment, the optical assembly 162 comprises a reflective mirror 1621 and a focusing lens 1622. The reflective mirror 1621 is located near the light source 161 for reflecting the light beam B, so that the light beam B is projected to a transparent part 1641 of the upper cover 164. The focusing lens 1622 is located near the sensing element 163. After the light beam B is reflected by the user's finger F, the light beam B is focused by the focusing lens 1622.

The sensing element 163 is used for receiving the focused light beam B, thereby generating plural image signals S4. The optical controller 165 is connected with the sensing element 163 and the controlling unit 18. After the plural image signals S4 are analyzed by the optical controller 165, the corresponding moving trajectory signal S2 is generated by the optical controller 165 and the moving trajectory signal S2 is transmitted to the controlling unit 18. The moving trajectory signal S2 contains a vector corresponding to the movement of the user's finger F. The method of analyzing the plural image signals S4 and generating the moving trajectory signal S2 containing the vector corresponding to the movement of the user's finger F is well known to those skilled in the art, and is not redundantly described herein. An example of the sensing element 163 includes is not limited to a charge coupled device (CCD) or a complementary metal-oxide semiconductor (CMOS).

Figure 4:
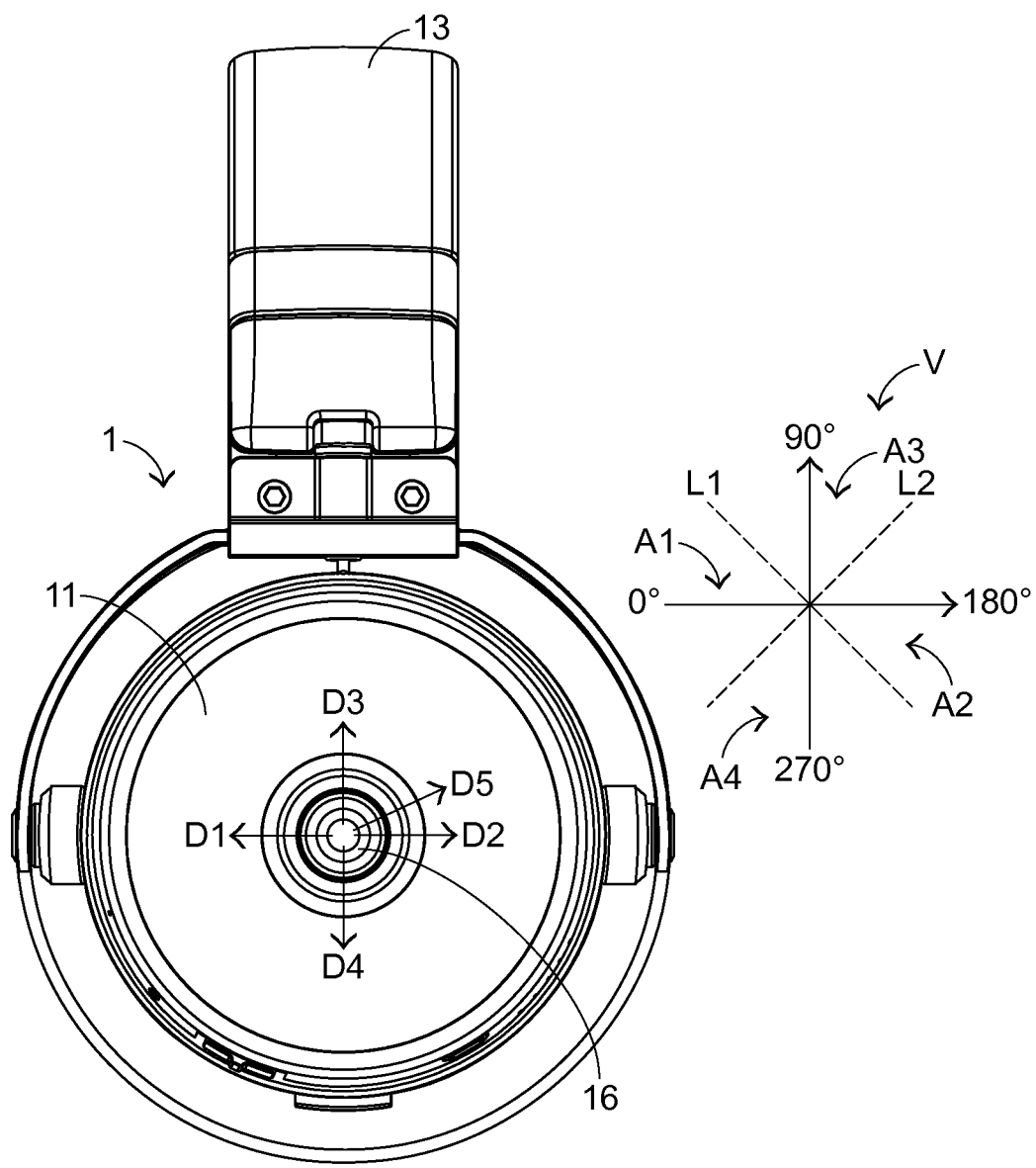
FIG. 4 is a schematic side view illustrating a portion of the headphone device according to the first embodiment of the present invention.

The principle of operating the optical finger navigation module 16 by the user will be illustrated as follows. FIG. 4 is a schematic side view illustrating a portion of the headphone device according to the first embodiment of the present invention. When the headphone device 1 worn by the user and the user's finger F is moved on the optical finger navigation module 16, the movement of the user's finger F is detected by the optical finger navigation module 16. Consequently, the moving trajectory signal S2 corresponding to the movement of the user's finger F is outputted from the optical finger navigation module 16 and transmitted to the controlling unit 18. After the moving trajectory signal S2 is analyzed by the controlling unit 18, the corresponding control signal S3 is generated.

Moreover, plural function commands corresponding to plural control signals S3 have been previously stored in the controlling unit 18. For example, if the user's finger F is moved on the optical finger navigation module 16 in a first direction D1, the optical finger navigation module 16 generates the moving trajectory signal S2 corresponding to the movement in the first direction D1, and the controlling unit 18 generates the control signal S3 corresponding to the first direction D1. Moreover, according to the control signal S3 corresponding to the first direction D1, the function command corresponding to the function of playing the previous song is executed.

If the user's finger F is moved on the optical finger navigation module 16 in a second direction D2, the optical finger navigation module 16 generates the moving trajectory signal S2 corresponding to the movement in the second direction D2, and the controlling unit 18 generates the control signal S3 corresponding to the second direction D2. Moreover, according to the control signal S3 corresponding to the second direction D2, the function command corresponding to the function of playing the next song is executed.

If the user's finger F is moved on the optical finger navigation module 16 in a third direction D3, the optical finger navigation module 16 generates the moving trajectory signal S2 corresponding to the movement in the third direction D3, and the controlling unit 18 generates the control signal S3 corresponding to the third direction D3. Moreover, according to the control signal S3 corresponding to the third direction D3, the function command corresponding to the function of increasing the sound volume is executed.

If the user's finger F is moved on the optical finger navigation module 16 in a fourth direction D4, the optical finger navigation module 16 generates the moving trajectory signal S2 corresponding to the movement in the fourth direction D4, and the controlling unit 18 generates the control signal S3 corresponding to the fourth direction D4. Moreover, according to the control signal S3 corresponding to the fourth direction D4, the function command corresponding to the function of decreasing the sound volume is executed.

In addition to the above function commands corresponding to the four moving directions, the following function commands may be previously stored in the controlling unit 18. Firstly, if the user's finger F continuously presses a position of the optical finger navigation module 16 for a specified time period (e.g. 2 seconds), the optical finger navigation module 16 generates the moving trajectory signal S2 corresponding to the non-movement, and the controlling unit 18 generates the corresponding control signal S3. Consequently, the function command corresponding to the function of allowing the audio generator 2 to answer a call is executed. Secondly, if the user's finger F continuously taps the optical finger navigation module 16 twice in a specified time period (e.g. 1 second), the optical finger navigation module 16 generates the moving trajectory signal S2 corresponding to the continuous tapping action, and the controlling unit 18 generates the corresponding control signal S3. Consequently, the function command corresponding to the function of allowing the audio generator 2 to play or pause is executed.

However, even if the user's finger F is accurately moved in the first direction D1, there is possibly an error angle between the moving trajectory of the user's finger F and the first direction D1. Consequently, an operating range corresponding to the first direction D1 is set in the controlling unit 18. That is, the trajectory within the operating range is considered as the movement in the first direction D1 by the controlling unit 18. In accordance with the present invention, the controlling unit 18 defines a vector coordinate system V, and the controlling unit 18 recognizes the moving direction corresponding to the moving trajectory of the user's finger F according to the vector coordinate system V.

An example of the vector coordinate system V is shown in FIG. 4. The vector coordinate system V is divided into a first direction zone A1, a second direction zone A2, a third direction zone A3 and a fourth direction zone A4 by two diagonal lines L1 and L2. The first direction zone A1 covers the angle range between a first angle and a second angle, and the first direction zone A1 corresponds to the first direction D1. The second direction zone A2 covers the angle range between a third angle and a fourth angle, and the second direction zone A2 corresponds to the second direction D2. The third direction zone A3 covers the angle range between a fifth angle and a sixth angle, and the third direction zone A3 corresponds to the third direction D3. The fourth direction zone A4 covers the angle range between a seventh angle and an eighth angle, and the fourth direction zone A4 corresponds to the fourth direction D4.

In this embodiment, the first angle is 316°, and the second angle is 44°. Consequently, the first direction zone A1 covers the angle range between 316° and 44°. Moreover, the third angle is 136°, and the second angle is 224°. Consequently, the second direction zone A2 covers the angle range between 136° and 224°. Moreover, the fifth angle is 46°, and the sixth angle is 134°. Consequently, the third direction zone A3 covers the angle range between 46° and 134°. Moreover, the seventh angle is 226°, and the eighth angle is 314°. Consequently, the fourth direction zone A4 covers the angle range between 226° and 314°.

Hereinafter, the operating principle of moving the user's finger on the optical finger navigation module 16 will be illustrated with reference to FIG. 2 and FIG. 4. For example, if the user's finger F is moved on the optical finger navigation module 16 in a fifth direction D5, the optical finger navigation module 16 generates the moving trajectory signal S2 corresponding to the movement in the fifth direction D5. Since the fifth direction D5 is not identical to any of the first direction D1, the second direction D2, the third direction D3 and the fourth direction D4, the controlling unit 18 then calculates the vector of the fifth direction D5. For example, if the vector of the fifth direction D5 obtained by the controlling unit 18 is 150°, the controlling unit 18 realizes that the vector of the fifth direction D5 is correlated with the second direction zone A2 according to the vector coordinate system V. Consequently, the controlling unit 18 generates the control signal S3 corresponding to the second direction D2. The control signal S3 is transmitted to the audio generator 2 through the first wireless transmission module 17. According to the control signal S3, the function command corresponding to the function of playing the next song is executed.

Figure 5:
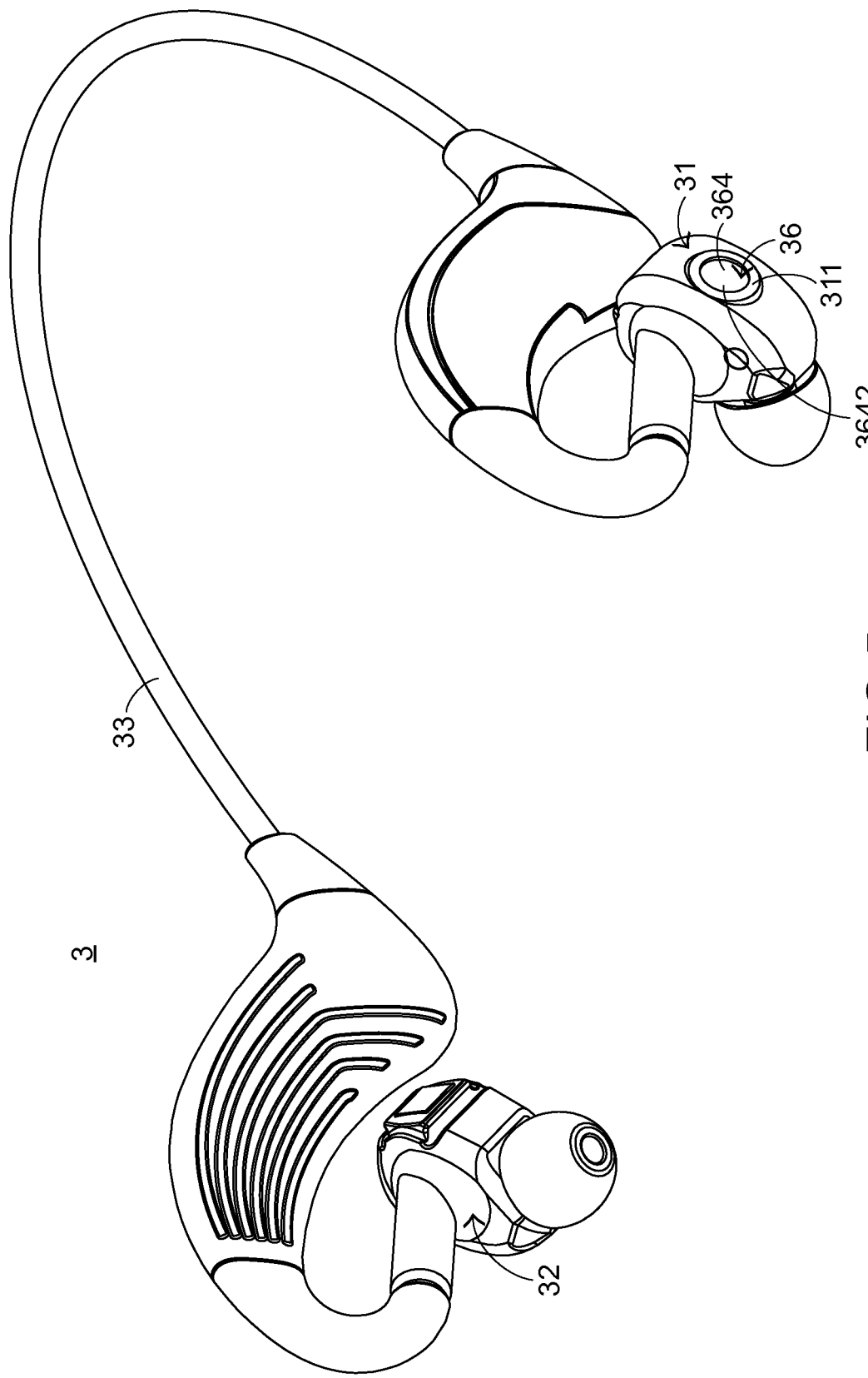
FIG. 5 is a schematic perspective view illustrating the structure of a headphone device with a controlling function according to a second embodiment of the present invention.

The present invention further provides a second embodiment, which is distinguished from the first embodiment. FIG. 5 is a schematic perspective view illustrating the structure of a headphone device with a controlling function according to a second embodiment of the present invention. The headphone device 3 comprises a first headphone body 31, a second headphone body 32, a head band 33, a first speaker (not shown), a second speaker (not shown), an optical finger navigation module 36, a wireless transmission module (not shown) and a controlling unit (not shown). In comparison with the first embodiment, the headphone device 3 of this embodiment is an in-ear type headphone device. The functions and the structures of other components of the headphone device 3 are identical to those of the first embodiment, and are not redundantly described herein.

As shown in FIG. 5, the volume of the first headphone body 31 of the headphone device 3 is very small. Consequently, the control panel with the general panel is difficulty installed on the first headphone body 31. However, since the optical finger navigation module 36 is slim and small, the optical finger navigation module 36 can be installed on an operating surface 311 of the first headphone body 31 so as to be operated by the user.

Figure 6:
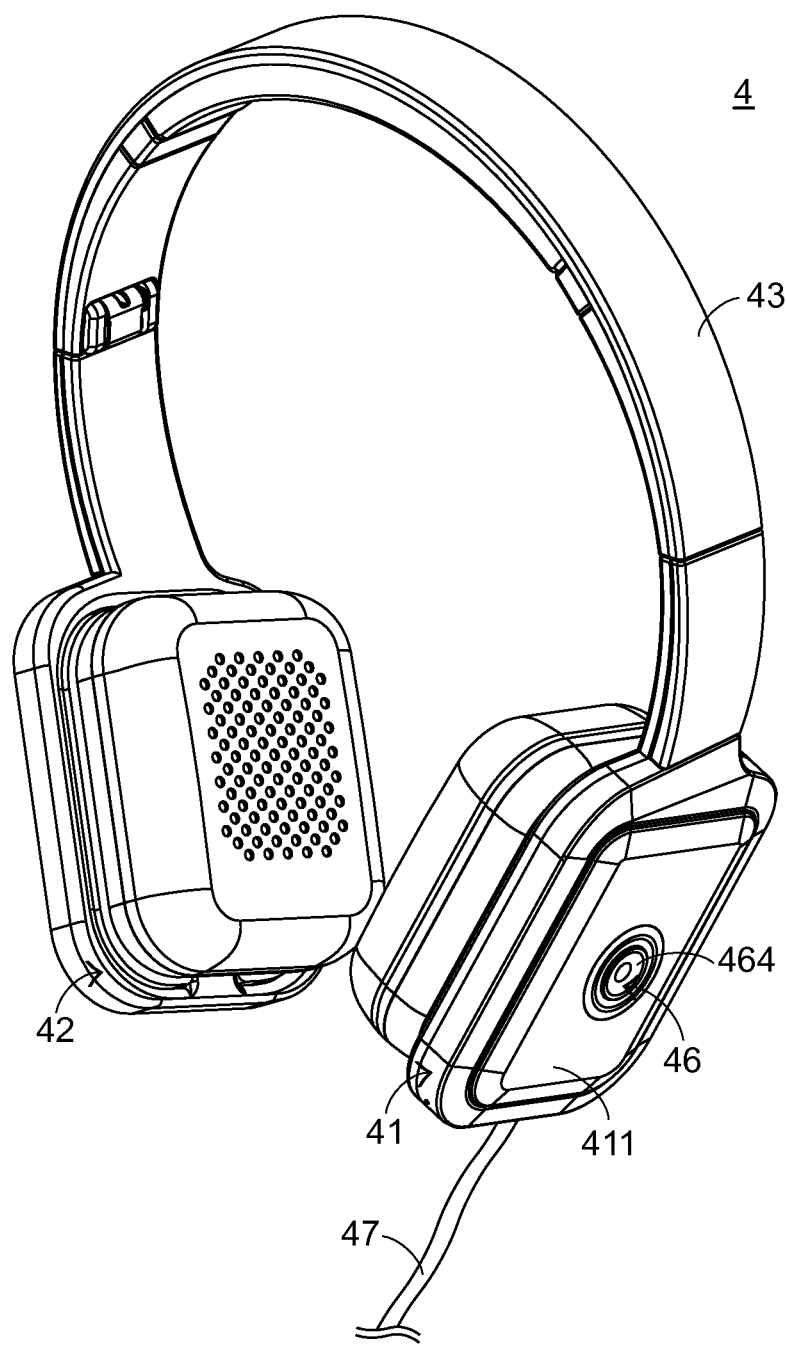
FIG. 6 is a schematic perspective view illustrating the structure of a headphone device with a controlling function according to a third embodiment of the present invention.
Figure 7:
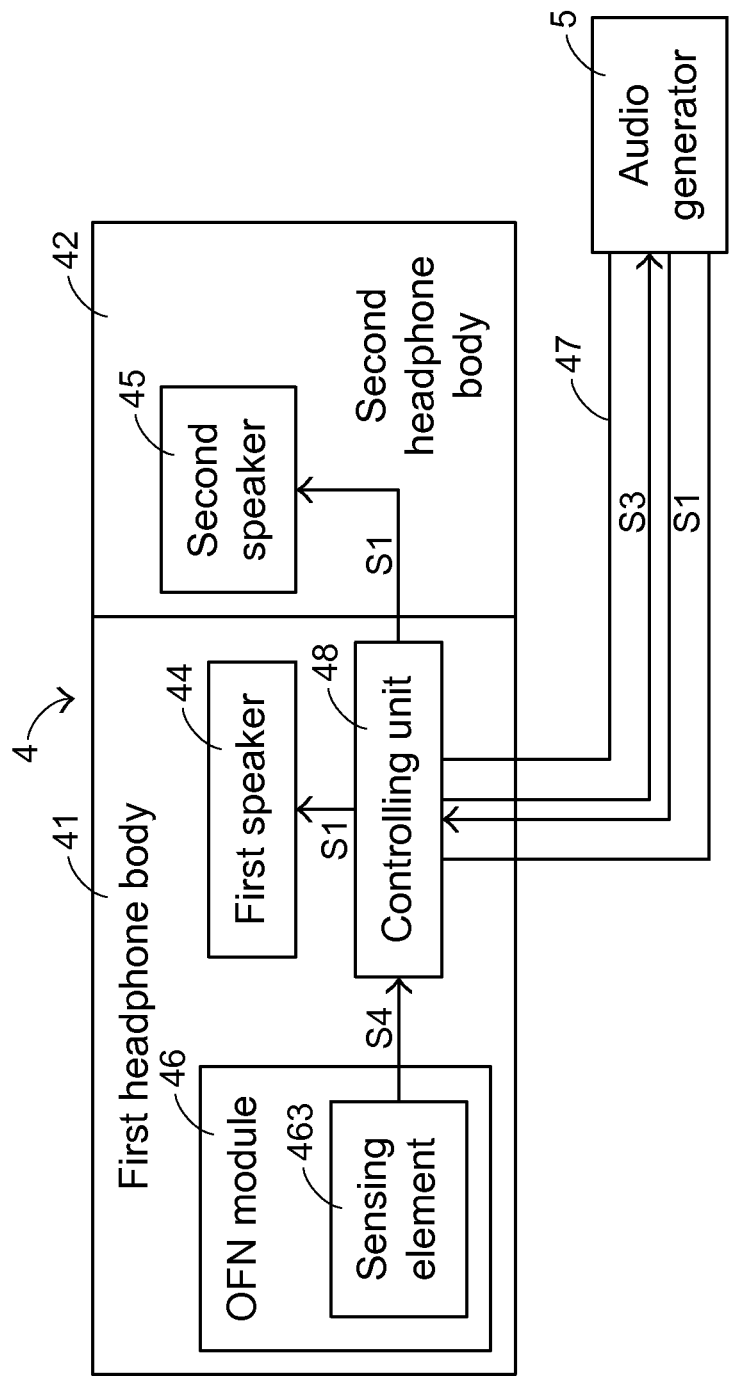
FIG. 7 is a schematic functional block diagram illustrating the headphone device according to the third embodiment of the present invention.

The present invention further provides a third embodiment, which is distinguished from the above embodiments. Please refer to FIGS. 6 and 7. FIG. 6 is a schematic perspective view illustrating the structure of a headphone device with a controlling function according to a third embodiment of the present invention. FIG. 7 is a schematic functional block diagram illustrating the headphone device according to the third embodiment of the present invention. The headphone device 4 is in communication with an audio generator 5. The audio generator 5 may generate a sound signal S1. The headphone device 4 is used for receiving and playing the sound signal S1. The headphone device 4 comprises a first headphone body 41, a second headphone body 42, a head band 43, a first speaker 44, a second speaker 45, an optical finger navigation module 46, a connecting wire 47 and a controlling unit 48. Except for the following three items, the functions and the structures of other components of the headphone device 4 are identical to those of the first embodiment, and are not redundantly described herein.

Firstly, the headphone device 4 of this embodiment is a supra-aural headphone device, which is one kind of circumaural type headphone device. Secondly, the connecting wire 47 of the headphone device 4 is plugged into the audio generator 5, so that the wired connection between the headphone device 4 and the audio generator 5 is established. Thirdly, the optical finger navigation module 46 only comprises a light source, an optical assembly, a sensing element 463 and an upper cover 464. That is, the optical finger navigation module 46 does not comprise an optical controller. As shown in FIG. 7, the sensing element 463 of the optical finger navigation module 46 is connected with the controlling unit 48. After the plural image signals S4 from the sensing element 463 are analyzed by the controlling unit 48, the corresponding moving trajectory signal is obtained and the corresponding control signal S3 is generated by the controlling unit 48. In other words, the computing tasks of the controlling unit 18 and the optical controller 165 of the first embodiment are implemented by the controlling unit 48 of the headphone device 4 of this embodiment.

The following two aspects should be specially described. Firstly, in this embodiment, the optical finger navigation module 46 is installed on an operating surface 411 of the first headphone body 41, and the operating surface 411 is the outer surface of the first headphone body 41. It is noted that the position of the operating surface is not restricted. Alternatively, in another embodiment, the operating surface is a lateral side surface of the first headphone body. That is, the optical finger navigation module is installed on the lateral side surface of the first headphone body.

Secondly, when the headphone device 4 is worn by the user, it is desirable to facilitate the user to recognize the position of the optical finger navigation module 46 without the need of watching the optical finger navigation module 46. In a design, the altitude of the top surface of the optical finger navigation module 46 is different from (e.g. higher than) the altitude of the operating surface 411 of the first headphone body 41. Consequently, when the headphone device 4 is worn by the user and the user's finger F is in contact with the raised optical finger navigation module 46, the user can recognize the position of the optical finger navigation module 46. Under this circumstance, the user can operate the optical finger navigation module 46 without the need of watching the optical finger navigation module 46 with the user's eyes.

Moreover, the headphone device may have other designs so as to achieve the above benefits. For example, the altitude of the top surface of the optical finger navigation module is lower than the altitude of the operating surface of the first headphone body. Alternatively, a salient higher than the operating surface of the first headphone body is formed on the optical finger navigation module. Alternatively, a recess lower than the operating surface of the first headphone body is formed in the surface of the optical finger navigation module. In other words, since the altitude of the optical finger navigation module and the altitude of the operating surface of the first headphone body are different from each other, the user can easily recognize the position of the optical finger navigation module. It is noted that the relationship between the altitude of the optical finger navigation module and the altitude of the operating surface of the first headphone body is not restricted. For example, in some other embodiments, the altitude of the optical finger navigation module and the altitude of the operating surface of the first headphone body are identical to each other.

From the above descriptions, the present invention provides a headphone device with a controlling function. An optical finger navigation module is installed on a headphone body for allowing the user to perform the control function. After the optical finger navigation module detects the movement of the finger or the tapping action of the finger, plural image signals are correspondingly generated. Consequently, even if the user wears a glove on a hand, the optical finger navigation module can be normally operated by the user without causing erroneous operation. Moreover, since the optical finger navigation module is cost-effective, slim and small, the optical finger navigation module can be applied to various types of headphone devices.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A headphone device with a controlling function, the headphone device being in communication with an audio generator to receive a sound signal from the audio generator, the headphone device comprising:

a headphone body in contact with an ear of a user;

a speaker disposed within the headphone body, wherein after the sound signal from the audio generator is received, the sound signal is outputted from the speaker; and an optical finger navigation module installed on the headphone body and exposed to an operating surface of the headphone body, wherein when an operation on the optical finger navigation module with a finger of the user is detected by the optical finger navigation module, the optical finger navigation module generates a control signal, wherein the optical finger navigation module comprises a light source emitting a light beam, an optical assembly reflecting the light beam to the finger and focusing the light beam which is reflected by the finger, a sensing element receiving the focused light beam, and generating plural image signals according to the focused light beam, and an upper cover sheltering the optical assembly, wherein the upper cover has a transparent part, and the light beam is transmissible through the transparent part, wherein the upper cover is exposed to the headphone body and a top surface of the upper cover is higher than the operating surface of the headphone body, wherein the optical assembly comprises a reflective mirror located near the light source and when the light beam is reflected by the reflective mirror, the light beam is projected to the transparent part of the upper cover, and a focusing lens located near the sensing element, wherein after the light beam is reflected by the finger, the light beam is focused by the focusing lens.

2. The headphone device according to claim 1, wherein the operating surface of the headphone body is an outer surface or a lateral side surface of the headphone body.

3. A headphone device with a controlling function, the headphone device being in communication with an audio generator to receive a sound signal from the audio generator, the headphone device comprising:
   a headphone body in contact with an ear of a user;
   a speaker disposed within the headphone body, wherein after the sound signal from the audio generator is received, the sound signal is outputted from the speaker; and
   an optical finger navigation module installed on the headphone body and exposed to an operating surface of the headphone body, wherein when an operation on the optical finger navigation module with a finger of the user is detected by the optical finger navigation module, the optical finger navigation module generates a control signal, wherein the optical finger navigation module comprises a light source emitting a light beam, an optical assembly reflecting the light beam to the finger and focusing the light beam which is reflected by the finger, a sensing element receiving the focused light beam, and generating plural image signals according to the focused light beam, and an upper cover sheltering the optical assembly, wherein the upper cover has a transparent part, and the light beam is transmissible through the transparent part, and the headphone device further comprising:
   a wireless transmission module disposed within the headphone body, wherein when a wireless connection between the headphone device and the audio generator is established through the wireless transmission module by a wireless transmission technology, the sound signal and the control signal are transmitted between the headphone device and the audio generator; and
   a controlling unit disposed within the headphone body, and connected with the optical finger navigation module and the wireless transmission module, wherein the controlling unit generates the corresponding control signal according to the plural image signals generated by the optical finger navigation module, and the control signal is transmitted from the controlling unit to the audio generator through the wireless transmission module.

4. The headphone device according to claim 3, wherein after the plural image signals are received by the controlling unit, the plural image signals are analyzed by the controlling unit, so that a moving trajectory signal is generated, wherein the controlling unit generates the corresponding control signal according to the moving trajectory signal, wherein the controlling unit defines a vector coordinate system, wherein the vector coordinate system is divided into a first direction zone, a second direction zone, a third direction zone and a fourth direction zone.

5. The headphone device according to claim 4, wherein if a vector corresponding to the moving trajectory signal lies in the first direction zone, the control signal corresponding to the first direction zone is generated by the controlling unit, wherein if the vector corresponding to the moving trajectory signal lies in the second direction zone, the control signal corresponding to the second direction zone is generated by the controlling unit, wherein if the vector corresponding to the moving trajectory signal lies in the third direction zone, the control signal corresponding to the third direction zone is generated by the controlling unit, wherein if the vector corresponding to the moving trajectory signal lies in the fourth direction zone, the control signal corresponding to the fourth direction zone is generated by the controlling unit.

6. A headphone device with a controlling function, the headphone device being in communication with an audio generator to receive a sound signal from the audio generator, the headphone device comprising:
   a headphone body in contact with an ear of a user;
   a speaker disposed within the headphone body, wherein after the sound signal from the audio generator is received, the sound signal is outputted from the speaker; and
   an optical finger navigation module installed on the headphone body and exposed to an operating surface of the headphone body, wherein when an operation on the optical finger navigation module with a finger of the user is detected by the optical finger navigation module, the optical finger navigation module generates a control signal, wherein the optical finger navigation module comprises a light source emitting a light beam, an optical assembly reflecting the light beam to the finger and focusing the light beam which is reflected by the finger, a sensing element receiving the focused light beam, and generating plural image signals according to the focused light beam, and an upper cover sheltering the optical assembly, wherein the upper cover has a transparent part, and the light beam is transmissible through the transparent part, and the headphone device further comprising:
   a connecting wire, wherein after the connecting wire is plugged into the audio generator, a wired connection between the headphone device and the audio generator is established; and
   a controlling unit disposed within the headphone body, and connected with the optical finger navigation module and the connecting wire, wherein the controlling unit generates the corresponding control signal according to the plural image signals generated by the optical finger navigation module, and the control signal is transmitted from the controlling unit to the audio generator through the connecting wire.

7. The headphone device according to claim 6, wherein after the plural image signals are received by the controlling unit, the plural image signals are analyzed by the controlling unit, so that a moving trajectory signal is generated, wherein the controlling unit generates the corresponding control signal according to the moving trajectory signal, wherein the controlling unit defines a vector coordinate system, wherein the vector coordinate system is divided into a first direction zone, a second direction zone, a third direction zone and a fourth direction zone.

8. The headphone device according to claim 7, wherein if a vector corresponding to the moving trajectory signal lies in the first direction zone, the control signal corresponding to the first direction zone is generated by the controlling unit, wherein if the vector corresponding to the moving trajectory signal lies in the second direction zone, the control signal corresponding to the second direction zone is generated by the controlling unit, wherein if the vector corresponding to the moving trajectory signal lies in the third direction zone, the control signal corresponding to the third direction zone is generated by the controlling unit, wherein if the vector corresponding to the moving trajectory signal lies in the fourth direction zone, the control signal corresponding to the fourth direction zone is generated by the controlling unit.

* * * * *